United States Patent Office 3,282,825
Patented Nov. 1, 1966

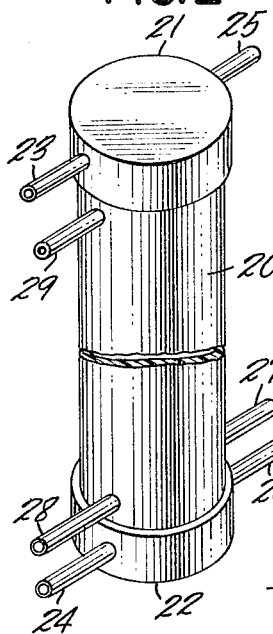
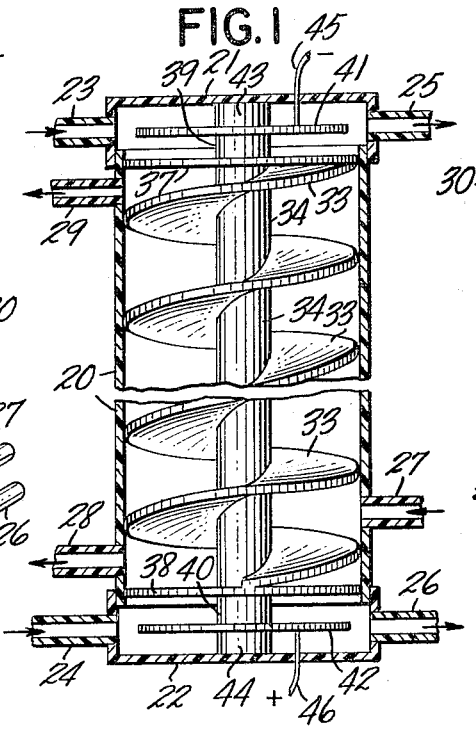
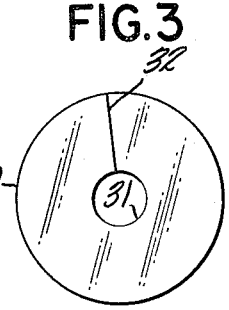
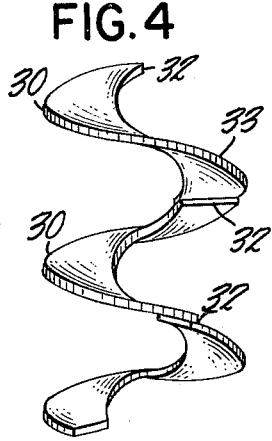
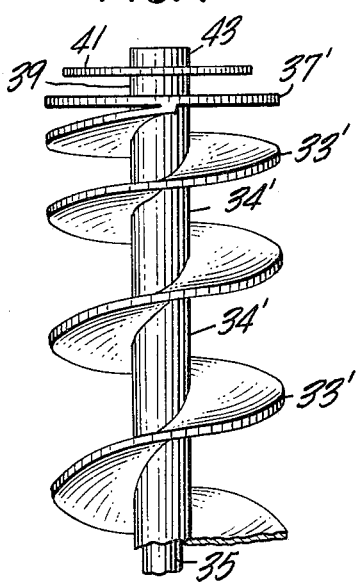
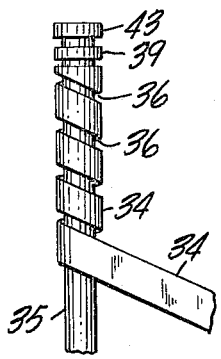
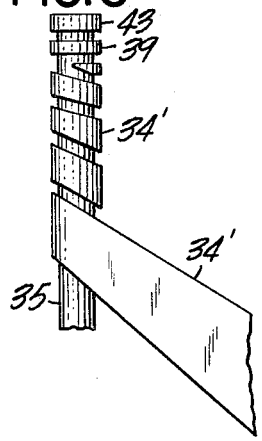
INVENTORS
JERRY H. BROWN &
DAVID G. CONNING

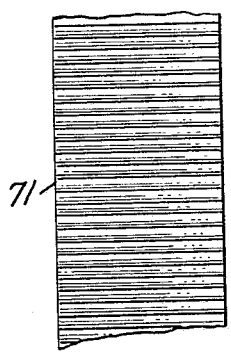
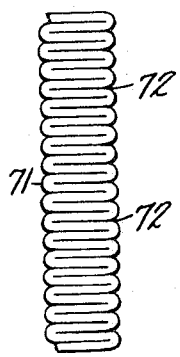
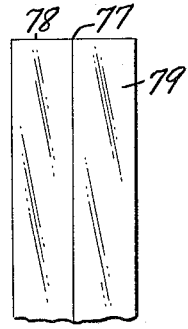
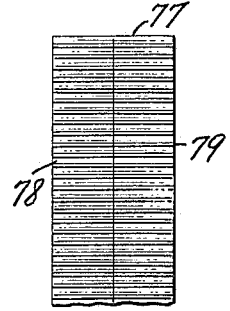
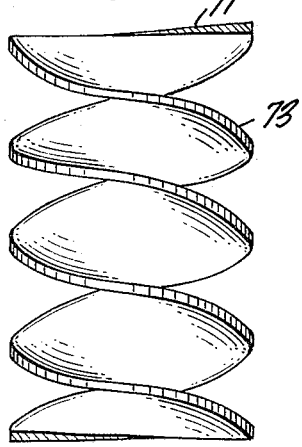
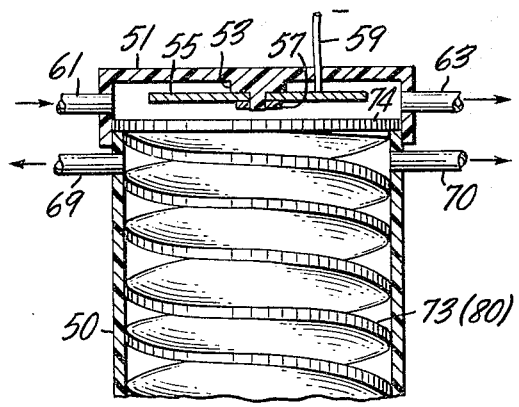
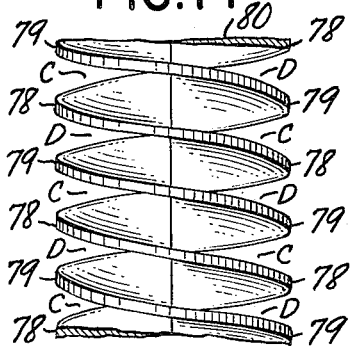

3,282,825
ELECTRODIALYSIS PROCESS AND APPARATUS USING A HELICALLY FORMED MEMBRANE
Jerry Hugh Brown, Springdale, and David Guy Conning, Stamford, Conn., assignors to American Machine & Foundry Company, a corporation of New Jersey
Filed Apr. 3, 1963, Ser. No. 270,453
15 Claims. (Cl. 204—301)

This invention relates in general to electrodialysis and, more particularly, to stack construction and operation for electrodialysis and electrogravitational devices.

A main object of this invention is to provide a stack construction which may be more inexpensively manufactured and which will provide a longer fluid treatment path.

Another object of this invention is to provide a stack construction which may be more readily adapted to mass production methods.

A feature of this invention is the provision of ion selective membrane material fabricated into an elongated helical construction which is surrounded by a cylindrical container to define elongated fluid treatment paths.

Many other objects, advantages and features of invention reside in the construction, arrangement and combination of parts involved in the embodiments of this invention and its practice as will be understood from the following description and accompanying drawing wherein:

FIGURE 1 is a longitudinal vertical section through the outer casing of an electrogravitational device according to the first embodiment of this invention, the vertical section showing the disposition of a helically wound membrane within the outer casing;

FIGURE 2 is a perspective view of an electrogravitational device according to this invention;

FIGURE 3 is a plan view of a disk of membrane material;

FIGURE 4 is a side view of a number of disks of membrane material joined together to be formed into a helical construction;

FIGURE 5 is a side view of an axial rod partially wrapped in a strip of spacing material;

FIGURE 6 is a side view of an axial rod about which a strip of spacing material is being wrapped according to a modification of a first embodiment of this invention;

FIGURE 7 is a side view of an axial rod about which there is disposed membrane material formed into a helical construction according to a modification of a first embodiment of this invention;

FIGURE 8 shows a fragment of a strip of pleated or crimped membrane material;

FIGURE 9 is a side view of a tightly folded crimped or pleated strip of membrane material;

FIGURE 10 is a side view of a piece of crimped or pleated membrane material twisted into a helical construction according to a second embodiment of this invention;

FIGURE 11 is a vertical section through the cylindrical casing of a stack formed according to a second embodiment of this invention;

FIGURE 12 is a plan view of a fragment of membrane material according to a third embodiment of this invention;

FIGURE 13 is a plan view of a crimped or pleated piece of membrane material according to a third embodiment of this invention; and FIGURE 14 is a side view of a piece of crimped or pleated membrane material twisted into a helical construction according to a third embodiment of this invention.

Referring to the drawing in detail, FIGURES 1 and 2 show a cylindrical outer cover 20 of plastic or the like which has the upper and lower end caps 21 and 22 fixed over its ends. The end caps 21 and 22 may be force fitted into position about the ends of the cylindrical outer cover 20 or they may be attached in any other suitable manner. Electrode washing stream inlet tubes 23 and 24 and outlet tubes 25 and 26 extend from opposite sides of the upper and lower end caps 21 and 22. An inlet tube 27 extends through the wall of the cylindrical outer cover 20. A concentrate stream outlet tube 28 extends from a lower portion of the outer cover 20 and the dilute stream outlet tube 29 extends from an upper portion of outer cover 20.

Referring now to FIGURE 3, a number of disk shaped membranes 30 containing a central aperture 31 and a radial slit 32 are cut from material which may be treated to render it ion selective in that it is for example cation permeable and resists the passage of anions through it. As shown in FIGURE 4, the edges of the slit portions 32 of a number of the membranes 30 are overlapped and glued, heat sealed, ultrasonically fused, clamped or otherwise fixed together to form an elongated and relatively flexible helical construction 33. As shown in FIGURE 5, a strip of soft plastic material 34, such as a relatively thick strip of polyethylene, is wound downward in a spiral path about the central axial rod 35 which is made of an insulating material. As the soft plastic spacing strip 34 is wound downward about the axial rod 35, the assembled membranes forming the helical construction 33 may be wound with the strip of soft plastic material 34 about the axial rod 35 to extend into the spaces 36 between the turns of strip 34.

As shown in FIGURE 1, the helical construction 33 and the strip 34, which are wound together about the rod 35, are placed within the cylindrical outer cover 20. The upper and lower ends of the helical construction 33 may be bonded to disks 37 and 38 of membrane material through which the rod 35 passes. Spacers 39 and 40 of a soft resilient material, e.g. rubber or plastic, may then be forced over the ends of rod 35 to retain the disks 37 and 38 and the helical construction 33 in position on rod 35. If necessary, strip 34 may also be glued to rod 35. The disk shaped electrodes 41 and 42 have the ends of the rod 35 extend through them and they may be held in place on rod 35 by the spacers 43 and 44. The leads 45 and 36 are attached to the electrodes 41 and 42 and may be led through the end caps 21 and 22 in any suitable manner.

The first embodiment of this invention operates in the following manner. The leads 45 and 46 are connected to a suitable current source so that electrodes 41 and 42 function as a cathode and an anode respectively. Fluid flowing through the inlet and outlet tubes 23, 24, 25 and 26 washes the electrodes 41 and 42 to carry away gases and other impurities formed at the electrodes.

Fluid to be treated enters tube 27 and slowly rises through the helical path defined by the construction 33, the strip of soft plastic spacer material 34, and the cylindrical outer cover 20. A portion of the fluid entering through tube 27 flows out the upper tube 29 and a portion flows out the lower tube 28. This flow may be regulated by the use of tubes of various sizes or in any other suitable manner.

As anions in solution are drawn downward toward the anode 42, they cannot penetrate the cation permeable membrane material of the helical construction 33 and they remain on its upper surface. Cations drawn upward toward the cathode 41 pass upward through the cation permeable membrane material to form a more concentrated solution of anions and cations immediately above the upper surface of the helical construction 33. This more concentrated solution is of a greater density. At the same time, just below the lower surface of the helical construction 33, a slightly more dilute and less dense solution is formed. The more concentrated solution of greater density tends to flow downward under the influence of gravity while the less dense dilute solution rises upward. Therefore, with significant flow rates through tubes 27, 28 and 29, a less dense and considerably more dilute stream will flow from tube 29 while a more dense and concentrated stream will flow from tube 28.

Referring further to FIGURE 1, it will be evident that the electrical resistance of the more dilute solution near the top of the stack will be greater between any two convolutions of the helical construction 33 than will the more concentrated solution at the bottom of the stack. Therefore, as shown in FIGURE 6, the rod 35 may be wound with a strip 34' of soft plastic material which narrows toward one end. The narrower end of strip 34' is wound about the upper portion of rod 35. A helical construction 33' is then fixed to a disk of membrane material 37' and wound with the strip of soft plastic 34' downward about the rod 35. The wider lower portion of strip 34' then spaces the lower convolutions of the helical construction 33' further apart and the upper convolutions of the helical construction 33' closer together. This modification of the first embodiment of the invention tends to equalize the electrical resistance between the convolutions of the helical construction 33' and to lower the overall electrical resistance of the stack without affecting its performance.

A second embodiment of this invention is shown in FIGURE 11. A cylindrical outer casing 50 has the end caps 51 and 52 fixed over its ends. Two inward projections 53 and 54 of the end caps 51 and 52 have the disk shaped electrodes 55 and 56 placed about them. The electrodes 55 and 56 may be retained by suitable tightly fitting plastic rings 57 and 58 which fit firmly about the projections 53 and 54. Leads 59 and 60 extend through the end caps 51 and 52. Electrode washing stream inlet and outlet tubes 61, 62, 63 and 64 extend in and out of opposite sides of each end cap. Two inlet tubes 65 and 66 extend through the cylindrical outer casing 50. Two concentrate stream outlet tubes 67 and 68 extend from the lower portion of the cylindrical outer casing 50 and two dilute stream outlet tubes 69 and 70 extend from the upper portion of casing 50.

Referring now to FIGURES 8 and 9, a strip of cation permeable membrane material 71 is pleated or crimped along its entire length in tight folds 72. As shown in FIGURE 10, this crimped material may then be twisted to form the helical construction 73. The helical construction 73 has its upper and lower ends glued or otherwise fixed to the disks 74 and 75 which may, in turn, be fixed to the cylindrical outer cover 50. Thus it may be seen that the helical construction 73 forms a double helical path from the top of the bottom of the stack. In the manner which has been described, a more dense and concentrated solution will be drawn downward under the influence of gravity or other mechanical force such as centrifugal force to flow from tubes 67 and 68 while a less dense and more dilute solution will rise upward to flow from the outlet tubes 69 and 70. It is to be noted that the helical construction 73 forms a double helical path in two compartments.

Referring now to FIGURES 12, 13 and 14, a strip of membrane material 77 may be formed by gluing or otherwise joining together two narrower strips 78 and 79 of membrane material which are, respectively, anion and cation permeable membranes. Strip 77 is then crimped or pleated, as shown in FIGURE 13, and it is twisted into a helical construction 80 as shown in FIGURE 14. Helical construction 80 is glued to two disks 74 and 75 and placed within a cylindrical outer casing 50 between two end caps 51 and 52, as shown in FIGURE 11, to form the third embodiment of this invention. As shown in FIGURE 14, two intertwined fluid treatment paths are defined by the helical construction 80. The path marked C will be a concentrating cell and the path marked D will be a diluting cell when construction 80 is placed in casing 50 between electrodes 55 and 56. Therefore, referring to FIGURE 11, tubes 65 and 66 may be blocked while fluid to be treated is introduced through tubes 67 and 68 to flow from tubes 69 and 70. Thus both a concentrate and a dilute stream will flow from tubes 69 and 70 and this third embodiment of the invention will function as a conventional electrodialysis stack without regard for any gravitational orientation.

What is claimed is:

1. In an electrodialysis apparatus, ion selective membrane material formed into a helical construction, a cover disposed about said helical construction, and electrodes disposed beyond the ends of said helical construction, said helical construction and said cover defining a helical fluid treatment path between said electrodes.

2. In an electrodialysis apparatus, ion selective membrane material formed into a helical construction, a cylindrical cover disposed about said helical construction, an inlet tube leading inside said cover and an outlet tube leading from said cover, electrodes disposed beyond the ends of said helical construction, said helical construction and said cylindrical cover defining at least one helical fluid treatment path between said electrodes, said inlet and outlet tubes connected to at least one helical fluid treatment path.

3. In an electrodialysis apparatus, cation permeable membrane material formed into a helical construction, a cylindrical cover disposed about said helical construction, an inlet tube leading inside said cover and outlet tubes leading from said cover, and electrodes disposed above and below the ends of said helical construction, said helical construction and said cover being substantially vertical and defining at least one helical fluid treatment path between said electrodes, said outlet tubes leading from upper and lower portions of said fluid treatment path.

4. In an electrodialysis apparatus, ion selective membrane material formed into a helical construction, an axial rod, a spacer strip, said spacer strip and said helical construction being wound about said axial rod with said helical construction extending between the turns of said spacer strip along said rod, a cylindrical cover disposed about said helical construction, an inlet tube leading into said cover, outlet tubes leading from said cover, and electrodes disposed beyond the ends of said helical construction, said helical construction, said axial rod, said spacer strip, and said cover defining a helical fluid treatment path between said electrodes, said outlet tubes leading from portions of said fluid treatment path.

5. The combination according to claim 4 wherein said spacer strip is tapered and wherein the narrow end of said tapered spacer strip is wound about one portion of said axial rod.

6. The combination according to claim 4 with the addition of disks of membrane material to which the ends of said helical construction are fixed, said disks of membrane material defining the ends of said fluid treatment path, end caps disposed over the ends of said cylindrical cover and said disks of membrane material, said end caps containing said electrodes, said electrodes being disposed beyond said disks of membrane material, and electrode washing stream inlet and outlet tubes extending into each end cap.

7. The combination according to claim 4 wherein one electrode is a cathode and another electrode is an anode, said ion selective membrane material being cation permeable.

8. In an electrodialysis apparatus, a strip of ion selective membrane material, said strip of ion selective membrane material forming a helical construction, a cover disposed about said helical construction, said cover and said helical construction forming two helical fluid treatment paths, inlet tubes leading inside said cover and outlet tubes leading from said cover, said tubes communicating with the ends of said fluid treatment paths, and electrodes disposed beyond the ends of said helical construction.

9. An electrodialysis apparatus comprising, in combination, a strip of ion selective membrane material forming a helical construction, a cover disposed about said helical construction, said cover and said helical construction being substantially vertical and defining two intertwined helical fluid treatment paths, electrodes disposed above and below said helical construction, inlet tubes leading inside said cover into said fluid treatment paths, and upper and lower outlet tubes leading from said cover and communicating with the upper and lower ends of said fluid treatment paths.

10. The combination according to claim 9 wherein said electrode disposed above said helical construction is a cathode and said electrode disposed below said helical construction is an anode, said ion selective membrane material being cation permeable.

11. An electrodialysis apparatus comprising, in combination, a strip of ion selective material, said strip being formed from strips of anion and cation permeable membrane material fixed side by side, said strip forming a helical construction, a cover disposed about said helical construction, said cover and said helical construction defining two fluid treatment paths, and electrodes disposed beyond said helical construction.

12. The combination according to claim 11 with the addition of inlet and outlet tubes communicating with the ends of said fluid treatment paths.

13. The combination according to claim 12 with the addition of disks of membrane material to which the ends of said helical construction are fixed, said electrodes being disposed beyond said disks.

14. The combination according to claim 13 with the addition of end caps fixed to said cover about said electrodes, said end caps having inlet and outlet electrode washing stream tubes extending into said end caps.

15. The process of treating electrolyte containing fluids which comprises passing said fluids through a helical path defined by ion selective material formed into a helical construction with a cover disposed about said helical construction, passing a current between a pair of electrodes disposed beyond the ends of said helical construction, and withdrawing fluid from opposite ends of said helical path.

References Cited by the Examiner

UNITED STATES PATENTS

| | | | |
|---|---|---|---|
| 410,976 | 9/1889 | Kerner et al. | 204—295 |
| 2,741,591 | 4/1956 | Dewey et al. | 204—301 |

JOHN H. MACK, *Primary Examiner.*

E. ZAGARELLA, *Assistant Examiner.*